(12) United States Patent
Gasser et al.

(10) Patent No.: US 8,220,883 B2
(45) Date of Patent: Jul. 17, 2012

(54) EJECTION DEVICE WITH SLIPPING CLUTCH

(75) Inventors: Ingo Gasser, Höchst (AT); Edgar Huber, Hard (AT)

(73) Assignee: Julius Blum GmbH, Hochst (AT)

( * ) Notice: Subject to any disclaimer, the term of this patent is extended or adjusted under 35 U.S.C. 154(b) by 973 days.

(21) Appl. No.: 12/222,044

(22) Filed: Jul. 31, 2008

(65) Prior Publication Data

US 2008/0290774 A1 Nov. 27, 2008

Related U.S. Application Data

(63) Continuation of application No. PCT/AT2006/000527, filed on Dec. 20, 2006.

(30) Foreign Application Priority Data

Feb. 8, 2006 (AT) .................................. A 188/2006

(51) Int. Cl.
*A47B 95/00* (2006.01)
(52) U.S. Cl. .......................................... 312/333; 464/30
(58) Field of Classification Search .................... 464/30, 464/37–40; 192/56.1, 79; 312/330.1, 319.1, 312/319.5–319.8, 333
See application file for complete search history.

(56) References Cited

U.S. PATENT DOCUMENTS

| | | | | |
|---|---|---|---|---|
| 2,868,001 | A * | 1/1959 | Russell | 464/30 |
| 3,450,365 | A * | 6/1969 | Kaplan | 464/40 X |
| 3,877,259 | A * | 4/1975 | Bishop | 464/37 |
| 5,234,089 | A * | 8/1993 | Itomi et al. | 464/40 X |
| 5,337,971 | A * | 8/1994 | Niedospial, Jr. | 192/56.1 X |
| 5,924,536 | A * | 7/1999 | Frenken | 192/56.1 |
| 6,309,303 | B1 * | 10/2001 | Vodicka | 464/30 |
| 7,270,429 | B2 * | 9/2007 | Peterson | 464/30 X |
| 7,712,592 | B2 * | 5/2010 | Jansen et al. | 464/40 X |
| 7,740,045 | B2 * | 6/2010 | Anderson et al. | |
| 7,793,560 | B2 * | 9/2010 | Bodine et al. | |
| 7,868,578 | B2 * | 1/2011 | Scheffknecht et al. | |
| 2003/0050121 | A1 * | 3/2003 | Takada et al. | 464/40 |
| 2004/0077410 | A1 * | 4/2004 | Gibbons et al. | 464/40 |

(Continued)

FOREIGN PATENT DOCUMENTS

AT 41 34 72 3/2006

(Continued)

OTHER PUBLICATIONS

English translation of Communication Relating to the Results of the Partial International Search issued in International Application No. PCT/AT2006/000527.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

An ejection device for a furniture part mounted movably in or on a furniture body includes an ejector, a drive unit, and a friction clutch. The friction clutch is designed in such a manner that it decouples the drive unit and the ejector from each other when a predetermined torque is exceeded. The friction clutch includes two parts which are rotatable in relation to each other with respect to two directions of rotation. A spring is provided which interacts with the two parts in such a manner that the torque at which the decoupling takes place differs for the two directions of rotation of the two parts.

9 Claims, 5 Drawing Sheets

U.S. PATENT DOCUMENTS

| | | | |
|---|---|---|---|
| 2005/0091928 A1 | 5/2005 | Okulov et al. | |
| 2006/0016283 A1 | 1/2006 | Owa et al. | |
| 2007/0180654 A1 | 8/2007 | Gasser | |
| 2009/0038904 A1* | 2/2009 | Bosk | 192/56.1 |
| 2010/0037715 A1* | 2/2010 | Gasser | |
| 2010/0178990 A1* | 7/2010 | Jansen et al. | 464/39 |
| 2010/0276244 A1* | 11/2010 | Bodine et al. | 192/56.1 |
| 2011/0092295 A1* | 4/2011 | Wernz et al. | 464/37 |

FOREIGN PATENT DOCUMENTS

| | | |
|---|---|---|
| DE | 196 15 415 | 10/1997 |
| DE | 203 08 256 | 6/2004 |
| DE | 10 2004 017 415 | 10/2005 |
| EP | 0 503 161 | 9/1992 |
| EP | 1 201 951 | 2/2002 |
| EP | 1 201 951 | 5/2002 |
| JP | 5-87339 | 11/1993 |
| JP | 2001-344860 | 12/2001 |
| JP | 2004-360895 | 12/2004 |
| WO | 2006/017864 | 2/2006 |

OTHER PUBLICATIONS

International Search Report issued Nov. 25, 2008 in connection with PCT/AT2006/000527 corresponding to the present U.S. application.

* cited by examiner

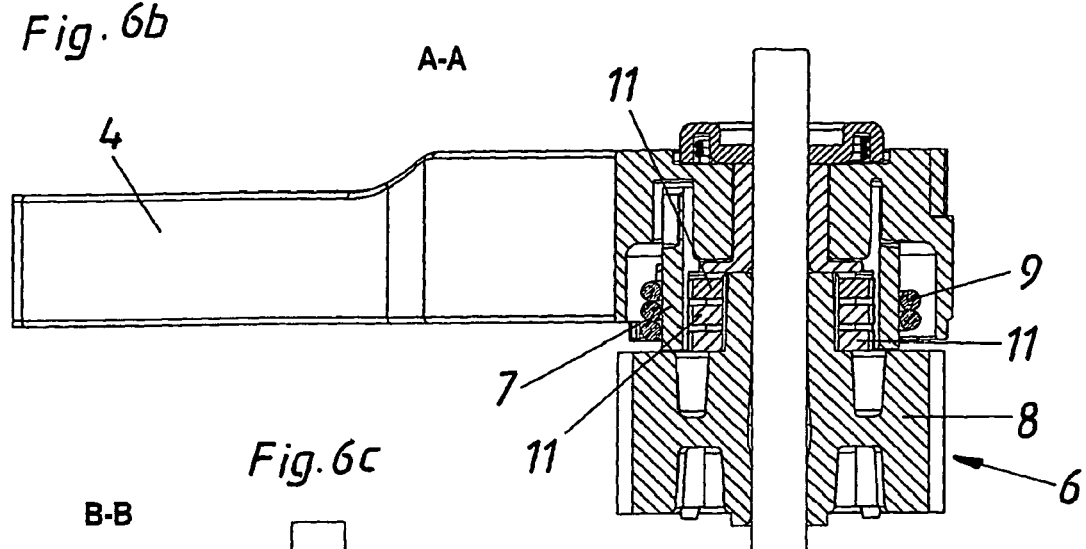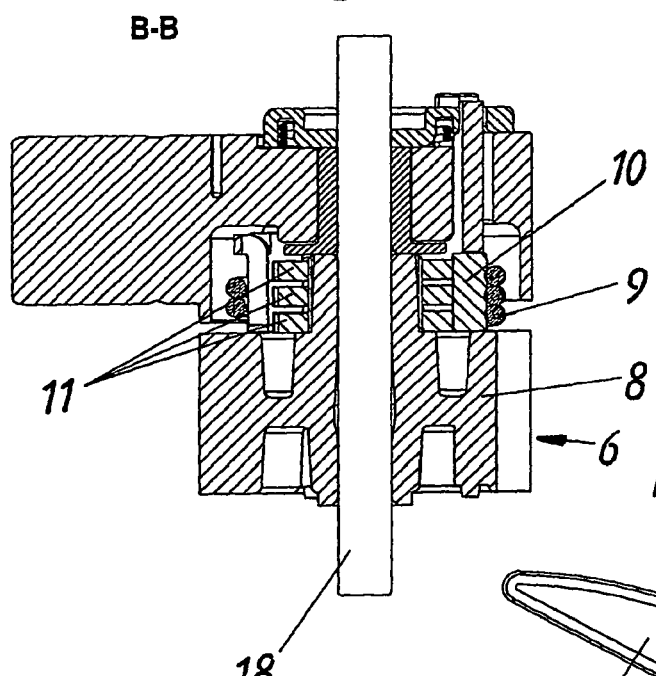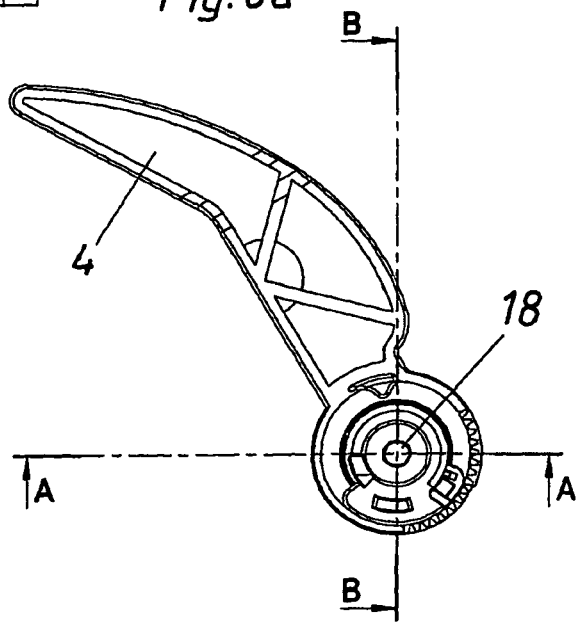

EJECTION DEVICE WITH SLIPPING CLUTCH

This application is a continuation of International Application No. PCT/AT2006/000527, filed Dec. 20, 2006.

BACKGROUND OF THE INVENTION

The present invention concerns an ejection device for a furniture portion mounted movably in or on a furniture body, comprising an ejector, a drive unit, and a slipping clutch. The slipping clutch is so designed that it uncouples the drive unit and the ejector from each other when a predetermined torque is exceeded.

An ejection device of that kind is to be found, for example, in FIGS. 10 and 11 of AT 413 472 B. The slipping clutch shown therein comprises a spring ring which is enlarged upon an excess loading and which slides over entrainment projections non-rotatably connected to the ejector to be driven, whereby uncoupling of the drive unit and the ejector from each other takes place.

The ejector of the ejection device is pivoted over a limited angular range by the drive unit. To eject the movable furniture portion, the ejector is pivoted in the direction of the movable furniture portion to apply the ejection force thereto. Thereafter, the ejector has to be put back into its starting position again, which is effected by a pivotal movement of the ejector in a direction of rotation which is opposite in relation to the ejection process.

The slipping clutch serves to prevent damage to the drive unit which can be caused by the application of an excessive force to the ejector which is coupled to the drive unit.

By way of example, the movable furniture portion can be pushed into its closed position by a user by a relatively high force before the ejector has moved back into its starting condition. When the movable furniture portion impacts against the ejector, the resulting force impact which is transmitted to the drive unit by way of the ejector can give rise to damage to or indeed destruction of the drive unit.

On the other hand, blocking of the movable furniture portion can occur during the ejection process. In that case there is also the fear of damage to the drive unit if the arrangement does not have an electronic regulating system which switches off the drive unit when a predetermined current strength is exceeded.

SUMMARY OF THE INVENTION

The object of the invention is to provide an alternative configuration for an ejection device which is safeguarded by a slipping clutch.

That object is attained by an ejection device having the features of the present invention.

The construction of the slipping clutch in accordance with the invention can provide that the torque at which uncoupling of the drive unit from the ejector takes place (override torque) can be selected to be different for each of the above-outlined situations. By way of example, the override torque can be selected to be relatively low after termination of the ejection process during the return of the ejector to its starting position as, in ordinary regular operation, there should in any case not be any external force applied to the ejector.

On the other hand the override torque should be set relatively high during the ejection process in order to prevent the slipping clutch from slipping during a per se ordinary and regular ejection process.

A structurally particularly simple configuration of the invention is one in which a spring co-operates with two portions in such a way that, upon a rotary movement of the two portions in a first one of two directions of rotation, there is a reduction in the diameter of the spring. The reduction in the diameter of the spring causes an increase in the coupling force of the two portions of the slipping clutch. That is equivalent to an increase in the override torque (that is to say, the torque at which uncoupling occurs is increased in relation to the value which was present prior to the reduction in the diameter of the spring). It can further be provided that the spring co-operates with the two portions in such a way that, upon a rotary movement of the two portions in a second one of the two directions of rotation, there is an enlargement of the spring. That involves a reduction in the override torque in relation to the override torque applicable prior to the expansion of the spring, in particular also in relation to the override torque which is present upon a reduction in the diameter of the spring.

In principle, it is preferable for the spring to be in the form of a coil spring because the fact that the coil spring extends three-dimensionally in the direction of the spring axis means that the spring can be well wound around a component. It would, however, also be conceivable to use a spring in the form of a spiral spring.

The mode of operation of the slipping clutch according to the invention is further enhanced if it is provided that the first portion has entrainment pins and the second portion has a toothed disc, wherein in the coupled condition of the slipping clutch the spring presses the entrainment pins against the toothed disc. If the override torque exceeds a predetermined value, the entrainment pins slip in relation to the toothed disc. That effect is also enhanced by the above-described advantageous measures in regard to the spring as, upon a reduction in the diameter of the spring, that means that the slipping action is made more difficult (and that therefore gives an increased override torque) while when the spring is enlarged that makes the slipping action easier (and therefore results in a reduction in the override torque).

In itself, the ejector can be coupled either to the first or the second portion of the slipping clutch. A particularly preferred embodiment is one in which the first portion of the slipping clutch is coupled to the ejector and the second portion of the slipping clutch is coupled to the drive unit.

It may be desirable for the slipping clutch to be designed in such a way that no uncoupling whatsoever occurs in one of the two possible directions of rotation of the two portions of the slipping clutch relative to each other. That may be desirable for example if, during the ejection process, there is in any case an electronic protective regulating system which prevents an excessive amount of force being applied by the drive unit. In that case, during the ejection process, a particularly high torque can be transmitted to the ejector and thus the movable furniture portion without that involving triggering of the slipping clutch. At the same time, however, this ensures that no harmful forces can be transmitted to the drive unit by way of the ejector during the return movement of the ejector to its starting position.

A further variant of the invention concerns an ejection device for a furniture portion mounted movably in or on a furniture body, comprising an ejector, a drive unit and a slipping clutch. The slipping clutch is so designed that it uncouples the drive unit and the ejector from each other when a predetermined torque is exceeded, in particular a slipping clutch according to one of the above-described embodiments, wherein the ejector is in the form of a lever and the slipping clutch is integrated in the lever.

Integration of the slipping clutch in the lever affords a particularly simple structure for the ejection device as it is possible to use both a commercially usual drive unit and also a commercially usual transmission arrangement which is usually connected between the drive unit and the lever.

It is particularly preferably provided that the axis about which the two portions of the slipping clutch are rotatable relative to each other forms the axis of rotation for the lever.

BRIEF DESCRIPTION OF THE DRAWINGS

Further advantages and details of the invention will be apparent from the following Figures and the related specific description. In the Figures:

FIGS. 6a, 6b and 6c show a further detail as a plan view, a first sectional view and a second sectional view.

DETAILED DESCRIPTION OF THE INVENTION

Figure 1:
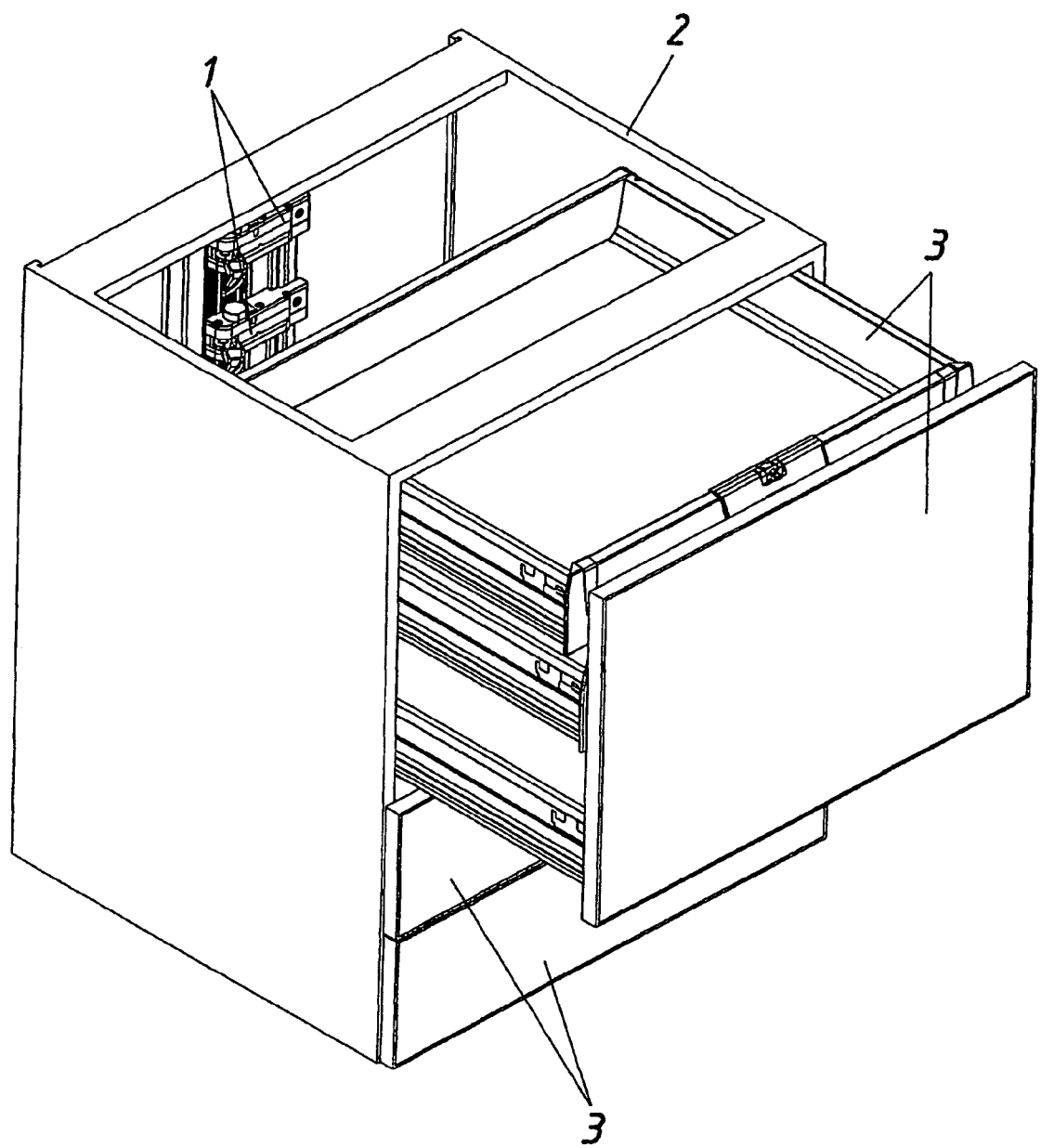
FIG. 1 shows a perspective view of an article of furniture with a plurality of ejection devices according to the invention.

FIG. 1 shows an article of furniture with a furniture body 2 and a plurality of furniture portions 3 which are mounted movably in the furniture body 2 and which in these embodiments are in the form of drawers. It is also possible to see at the rear side of the furniture body 2 two ejection devices 1 according to the invention which in this embodiment are mounted to a carrier element.

Figure 2:
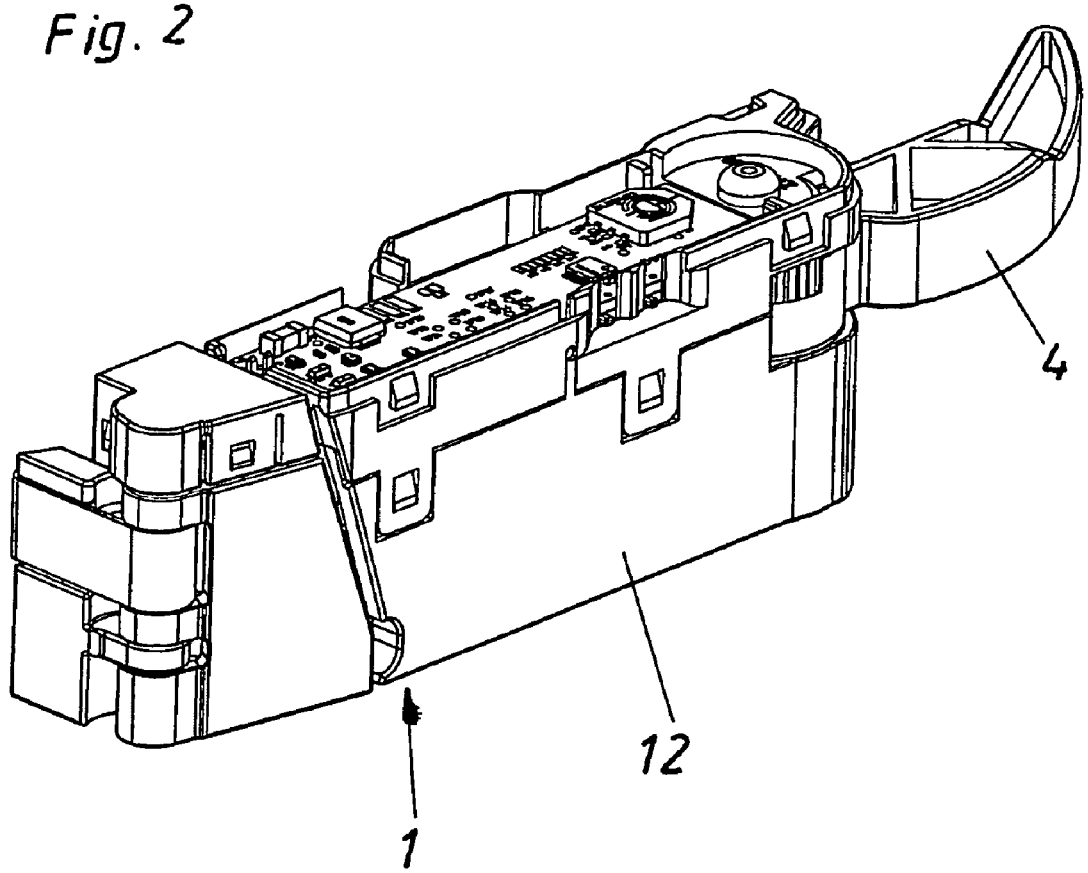
FIG. 2 shows a perspective view of an ejection device according to the invention.

FIG. 2 shows a perspective view of one of the ejection devices 1, in which respect it is possible to see in particular the ejector 4 which in this embodiment is in the form of a lever. The ejector 4 projects from a housing portion 12, with a transmission arrangement 13, a drive unit 5, and electronic circuits being disposed in the housing portion 12.

Figure 3:
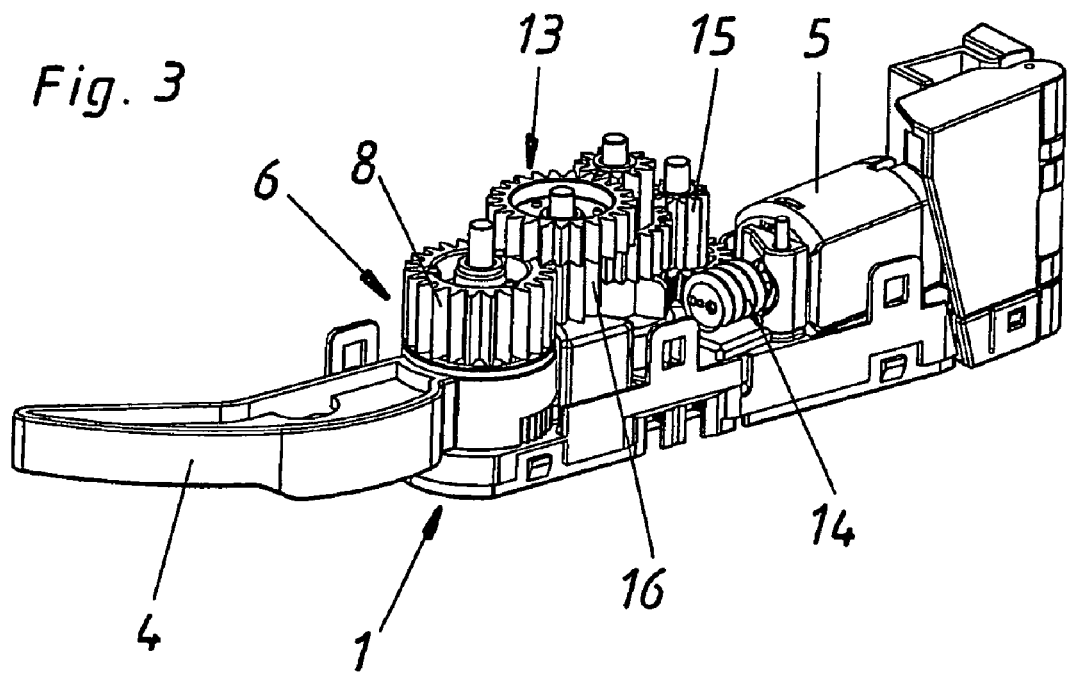
FIG. 3 shows the ejection device of FIG. 2 without its housing.

In FIG. 3 the cover of the housing portion 12 has been removed, which gives a view into the structure of the ejection device 1 according to the invention. It is possible to see the drive unit 5 which in this embodiment is in the form of an electric motor and which drives the first stage 15 of a transmission arrangement 13 by way of a spindle 14. The last stage 16 of the transmission arrangement 13 couples to the second portion 8 of the slipping clutch 6 which in this embodiment is integrated in the ejector 4 in the form of the lever.

Figure 4B:
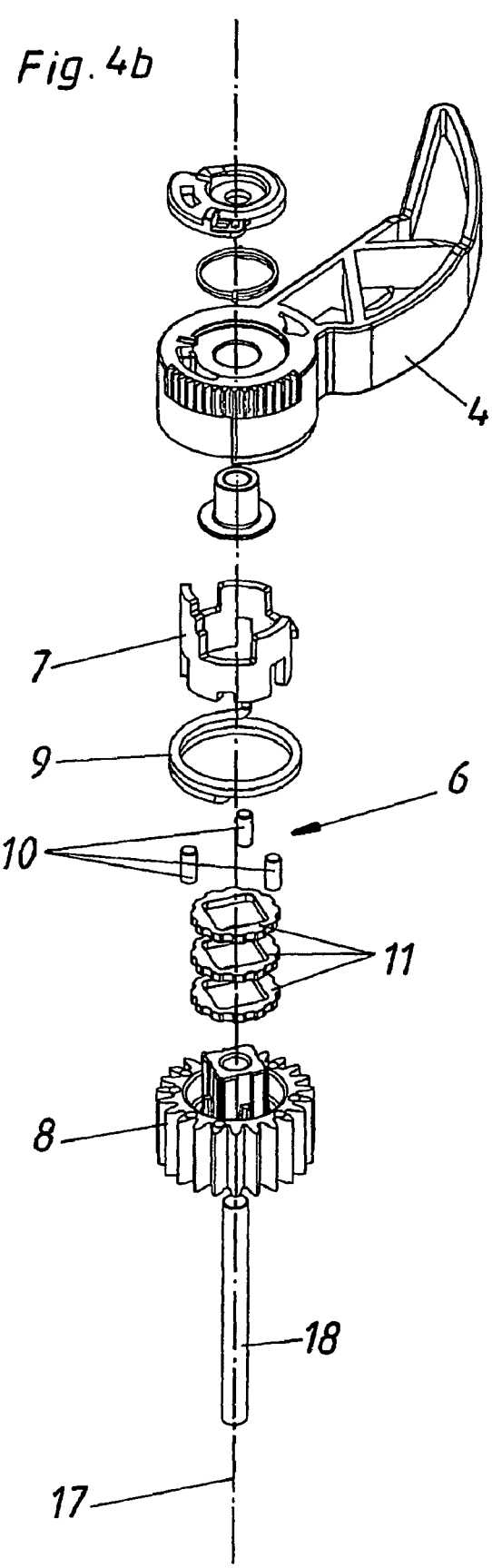
FIGS. 4a and 4b show a partial view of the ejection device shown in FIGS. 2 and 3 as a perspective view and an exploded view, respectively.
Figure 4A:
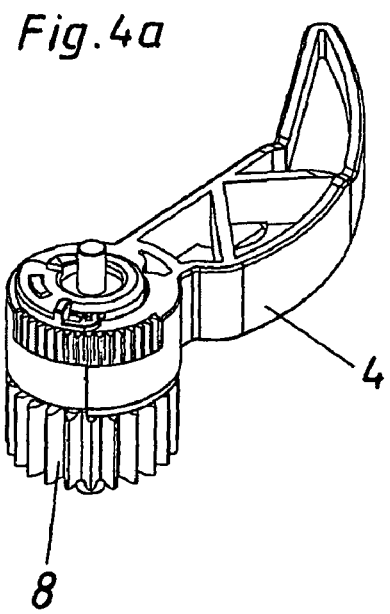

FIGS. 4a and 4b now show the structure of an embodiment of a slipping clutch 6 according to the invention in detail. In particular FIG. 4b shows that both a second portion 8 and also a first portion 7 of the slipping clutch 6 are arranged along a common axis 17. In this case, the second portion 8 is connected non-rotatably to a shaft 18. In this embodiment, three toothed discs 11 are in turn connected non-rotatably to the second portion 8. In this embodiment, three entrainment pins 10 are connected to the first portion 7 of the slipping clutch 6 in such a way that they admittedly entrain the first portion 7 upon a rotary movement about the axis 17, but have a certain radial mobility in relation to the axis 17. A spring 9 which in this embodiment is in the form of a coil spring is connected with its one (first) end to the first portion 7 and with its second end to the second portion 8 and is wound around the three entrainment pins 10.

In the coupled condition of the slipping clutch 6, the three entrainment pins 10 engage into the recesses which can be seen on the toothed discs 11 so that overall an uninterrupted line of force is formed between the drive unit 5 and the ejector 4 (by way of the transmission arrangement 13, the second portion 8, the toothed discs 11, the entrainment pins 10 and the first portion 7). When the two portions 7, 8 rotate in a first one of the two possible directions of rotation, that leads to a reduction in the diameter of the spring 9 whereby the entrainment pins 10 are pressed more firmly against the toothed discs 11. That leads to an increase in the override torque. If, in contrast, the two portions 7, 8 are rotated relative to each other in the second of the two directions of rotation (opposite the first direction), that leads to an expansion of the spring 9 whereby the entrainment pins 10 can escape (move) radially outwardly away from the toothed discs 11. That interrupts the transmission of force (torque) between the drive unit 5 and the ejector 4 and represents the uncoupled condition of the slipping clutch 6.

Figure 5A:
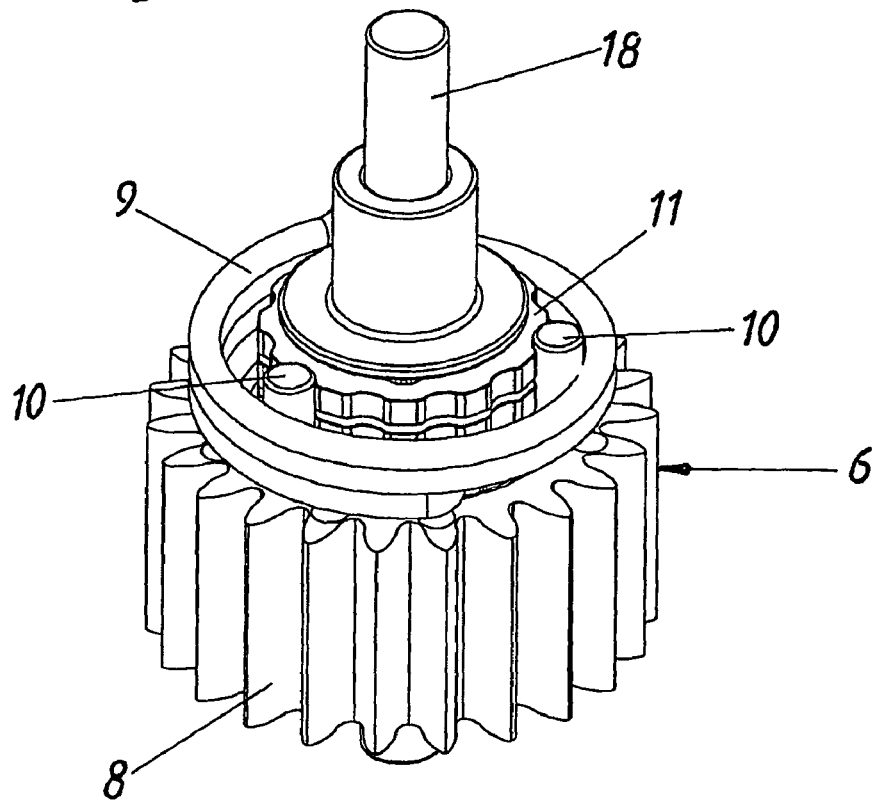
FIGS. 5a and 5b show a detail view of FIG. 4 as a perspective view and as a plan view, respectively.
Figure 5B:
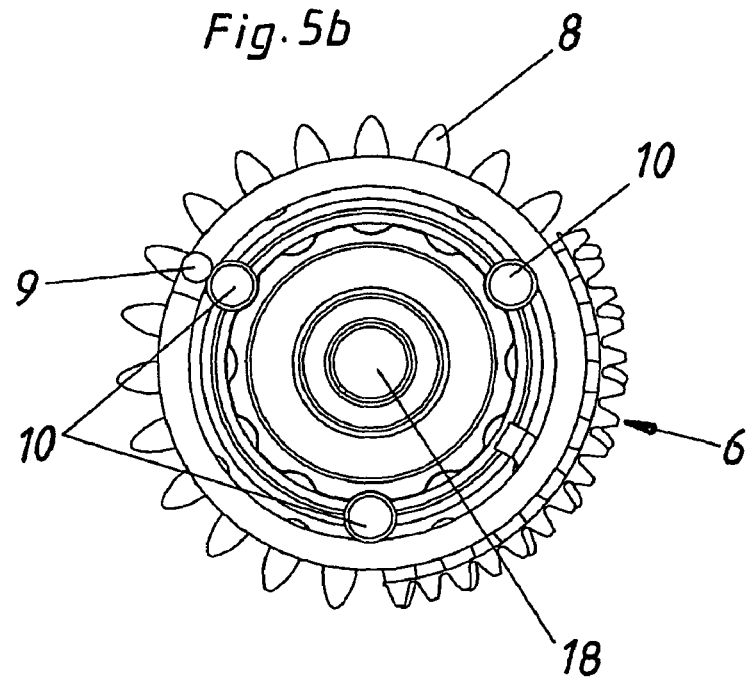

FIGS. 5a and 5b show a perspective view and a plan view, respectively, of the slipping clutch 6 in isolated form.

FIGS. 6b and 6c show sectional views corresponding to the lines shown in FIG. 6a. It is possible to see in these Figures in particular the integration of the slipping clutch 6 in the ejector 4.

The invention claimed is:

1. An ejection device for ejecting a furniture portion mounted movably in or on a furniture body, said ejection device comprising:
   an ejector lever for moving the furniture portion;
   a drive unit for driving said ejector lever; and
   a slipping clutch integrated into said ejector lever, said slipping clutch being configured to uncouple said drive unit and said ejector lever from each other when a predetermined torque is exceeded, said slipping clutch including:
      two portions rotatable relative to each other in two directions of rotation; and
      a spring configured to cooperate with said two portions such that a torque for uncoupling said drive unit and said ejector lever is different for said two directions of rotation of said two portions.

2. The ejection device according to claim 1, wherein said spring comprises a coil spring.

3. The ejection device according to claim 1, wherein said spring is configured to cooperate with said two portions so that, upon a rotary movement of said two portions in a first one of said two directions of rotation, a diameter of said spring is reduced.

4. The ejection device according to claim 1, wherein said spring is configured to cooperate with said two portions so that, upon a rotary movement of said two portions in a second one of said two directions of rotation, a diameter of said spring is enlarged.

5. The ejection device according to claim 1, wherein a first one of said two portions has pins entrained therein, and a second one of said two portions has a toothed disc, said spring being configured to press said pins against said toothed disc in a coupled condition of said slipping clutch.

6. The ejection device according to claim 1, wherein a first one of said two portions is connected to said ejector lever and a second one of said two portions is coupled to said drive unit.

7. The ejection device according to claim 1, wherein said slipping clutch is configured to uncouple said drive unit and said ejector lever from each other only in one of said two directions of rotation of said two portions.

8. The ejection device according to claim 1, wherein said two portions of said slipping clutch and said ejector lever share a common axis of rotation.

9. The ejection device according to claim 1, wherein said slipping clutch further includes:
   pins entrained within a first one of said two portions so as to be movable radially relative to said first one of said two portions; and
   toothed discs connected to a second one of said two portions such that said toothed discs are non-rotatable relative to said second one of said two portions;
   wherein said spring comprises a coil spring surrounding said pins and having a first end connected to said first one of said two portions and having a second end connected to said second one of said two portions, said slipping clutch being configured such that:
   when said two portions rotate in a first one of said two directions, a diameter of said coil spring is reduced so as to press said pins against said toothed discs to couple said first one of said two portions to said second one of two portions, and
   when said two portions rotate in a second one of said two directions, a diameter of said coil spring is enlarged so as to allow said pins to move radially away from said toothed discs to uncouple said first one of said two portions from said second one of two portions.

* * * * *